(12) United States Patent
Johnson

(10) Patent No.: US 7,997,889 B2
(45) Date of Patent: Aug. 16, 2011

(54) METHOD FOR MAKING HARD MOLD

(76) Inventor: Richie Johnson, Evansville, IN (US)

( * ) Notice: Subject to any disclaimer, the term of this patent is extended or adjusted under 35 U.S.C. 154(b) by 750 days.

(21) Appl. No.: 11/807,710

(22) Filed: May 29, 2007

(65) Prior Publication Data

US 2007/0273064 A1 Nov. 29, 2007

Related U.S. Application Data

(60) Provisional application No. 60/808,646, filed on May 26, 2006.

(51) Int. Cl.
B29C 59/00 (2006.01)
B28B 7/00 (2006.01)

(52) U.S. Cl. ............. 425/385; 249/114.1; 249/115; 249/134; 106/38.2; 264/219; 264/293

(58) Field of Classification Search ....... 249/114.1–116, 249/134, 135; 425/385, 403, 470; 264/212, 264/219, 220, 224–227, 241, 259, 266, 267, 264/293, 299, 306, 308, 331.19, 338; 106/38.2, 106/38.22, 38.9; 427/132–133; 428/114, 428/195.1

See application file for complete search history.

(56) References Cited

U.S. PATENT DOCUMENTS

| | | | | |
|---|---|---|---|---|
| 3,427,689 A | * | 2/1969 | Windecker | 425/90 |
| 3,615,071 A | * | 10/1971 | Harper | 249/112 |
| 5,489,082 A | * | 2/1996 | Imataki et al. | 249/61 |
| 5,604,019 A | * | 2/1997 | Bland et al. | 428/212 |
| 5,912,081 A | * | 6/1999 | Negele et al. | 428/423.1 |
| 6,372,323 B1 | * | 4/2002 | Kobe et al. | 428/119 |
| 6,523,804 B1 | * | 2/2003 | Blom et al. | 249/115 |
| 2002/0090500 A1 | * | 7/2002 | Martino | 428/292.4 |
| 2003/0047836 A1 | * | 3/2003 | Rickner et al. | 264/235 |
| 2003/0180521 A1 | * | 9/2003 | Iijima | 428/304.4 |
| 2004/0005436 A1 | * | 1/2004 | Mori et al. | 428/141 |
| 2005/0153107 A1 | * | 7/2005 | Iijima | 428/195.1 |
| 2007/0092699 A1 | * | 4/2007 | Luong et al. | 428/172 |
| 2008/0061214 A1 | * | 3/2008 | Lee et al. | 249/112 |

FOREIGN PATENT DOCUMENTS

JP 03-114575 A * 5/1991

* cited by examiner

*Primary Examiner* — Joseph S Del Sole
*Assistant Examiner* — Dimple Bodawala
(74) *Attorney, Agent, or Firm* — Gary K. Price

(57) ABSTRACT

A hard mold and method of preparing the mold is disclosed. The hard mold is designed for manufacturing articles having various shapes and patterns. The shaping mold includes a layer of hardened material provided over the entire surface of the selected master. The inventor has found that a polyurea coating or other polyurethane hybrid is preferred. Once the layer of hardened material has dried, the surface of the hardened material is sanded with a 20-40 grit sandpaper and a layer of polyester resin is then applied to the layer of hardened material. Once the polyester resin is applied, multiple layers of vinyl ester are applied to the polyester resin to prevent the polyester resin from shrinking. In the preferred embodiment, the application includes at least three (3) layers of vinyl ester.

8 Claims, 2 Drawing Sheets

METHOD FOR MAKING HARD MOLD

CROSS REFERENCES TO RELATED APPLICATIONS

U.S. Provisional Application for Patent No. 60/808,646, filed May 26, 2006, with title "Method for Making Hard Mold" which is hereby incorporated by reference. Applicant claims priority pursuant to 35 U.S.C. par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates to a hard mold and a method of preparing the mold, which mold is used for manufacturing articles having various patterns defined by unevenness of its surface such as a wood-grain pattern, a marbled pattern and the like. More particularly, the invention relates to a hard mold and a method of preparing the mold, which mold defines various shaping surfaces for forming various surface patterns.

2. Brief Description of Prior Art

It has been conventional practice to incorporate metal molds, polyurethane molds, or silicone molds when manufacturing articles having various shaped patterns defined by unevenness. With these type of molds, it is common practice to etch the uneven shaping surface on the mold. According to such a method, projections on the shaping surface are all of a relatively equal height since the unevenness of the metal mold surface is formed by etching. As a result, recesses of the pattern formed on the manufactured articles are all of the same depth, which fails to provide the articles with a sufficient touch of rich quality and fails to produce articles having a surface finish substantially similar if not identical to the surface of the material imitated.

As will be seen from the subsequent description, improvements are needed in hard mold technology. There is a need for a hard mold that overcomes the deficiencies of the prior art, that can be used for manufacturing articles having various patterns defined, and that produce articles having a realistic surface finish to that of the material imitated.

As will be described, the preferred embodiments of the present invention overcome disadvantages of the prior art.

SUMMARY OF THE INVENTION

In accordance with the present invention, a hard mold used for manufacturing articles having various shapes and patterns defined is provided. The shaping mold generally comprises a master substrate fixably superposed by a coating of hardened material. The inventor has found that a polyurea coating or other polyurethane hybrid is preferred. The layer or coating of hardened material is provided over the entire surface of the master. Once the layer of hardened material has dried, a layer of polyester resin is applied to the layer of hardened material. Prior to applying the layer of polyester resin, the surface of the hardened material is sanded with a 20-40 grit sandpaper. Roughing up the surface area prior to applying the layer of polyester resin causes the layer of hardened material to better adhere to the polyester resin. Once the polyester resin is applied, multiple layers of vinyl ester are applied to the polyester resin to prevent the polyester resin from shrinking. In the preferred embodiment, the application includes at least three (3) layers of vinyl ester.

The resulting hard mold performs with increased precision without breaks or cracks occurring to the shaping surface and provides excellent heat and pressure resistance with no loss of shrink control.

DESCRIPTION OF THE PREFERRED EMBODIMENT

Figure 1:
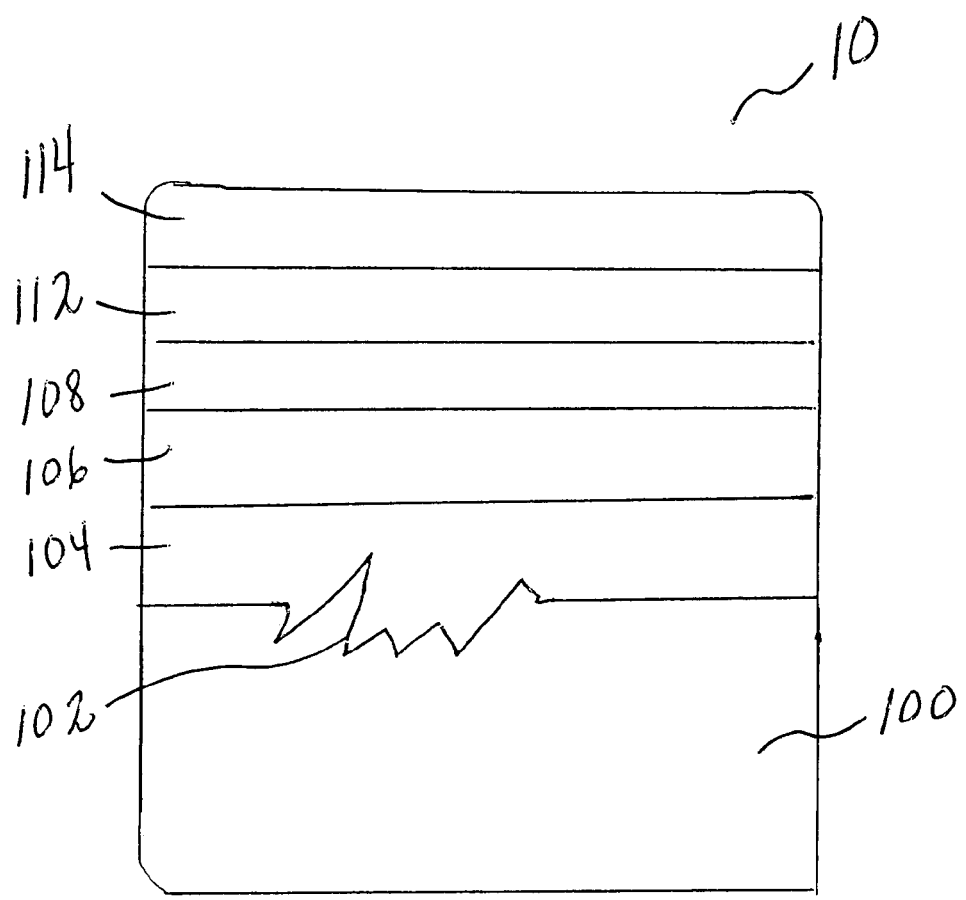
FIG. 1 shows a cross-section of the mold as it is formed.
Figure 2:
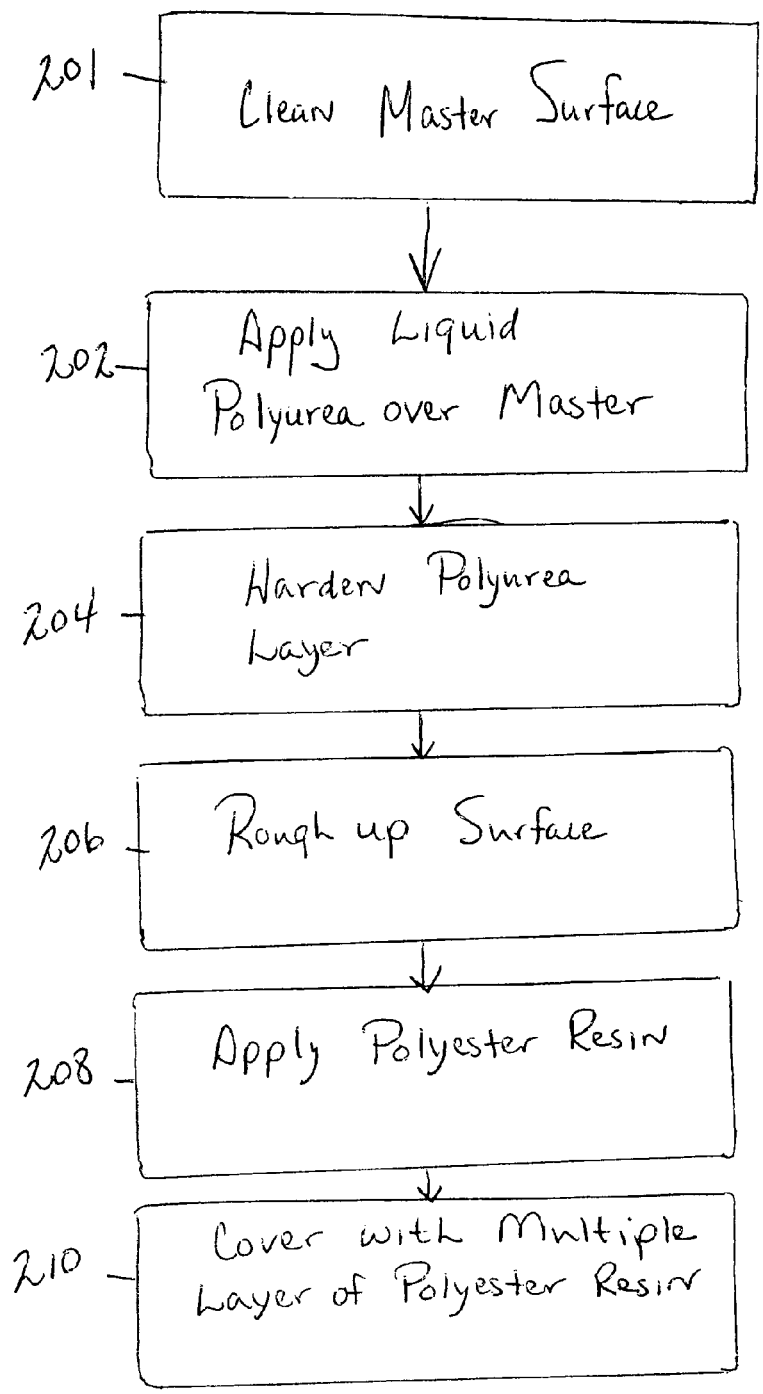
FIG. 2 shows the steps of the method of forming the mold.
The present invention will be illustrated on the basis of the figures and following description of a preferred embodiment thereof.

In accordance with the present invention, a hard mold 10 for manufacturing articles having various shapes and patterns defined is disclosed. The hard mold 10 of the present invention is directed to a shaping mold and method of preparing the mold for manufacturing articles, primarily plastic articles, having various shapes and patterns defined by unevenness of its surface such as a wood-grain pattern, a marbled pattern, and the like. In the broadest context, the hard mold 10 and method of the present invention consists of components configured and correlated with respect to each other so as to attain the desired objective.

The shaping mold 10 according to the invention is intended for production of various articles ("article") having a pattern defined by its shape and/or unevenness of its surface. The shaping mold 10 generally includes a master substrate fixably superposed by a coating of hardened material 104. Characteristics of as suitable hardened material 104 should include toughness, impact, abrasion, corrosion and thermal shrink resistance. The Inventor has found that a polyurea coating (commercially available by Futura/Devcon Coatings, Inc.) or other polyurethane hybrid is preferred. The hardened material is required to have surface-hardness and an ornamental effect if desired. Thus the layer 104 of hardened material should withstand mechanical shock and thermal shock due to hot temperatures. And, the layer 104 should not adhere to the surface 102 of the master 100 in order to avoid defects, such as surfaces blemishes. Said another way, it should break away clean.

The layer 104 or coating of hardened material is provided over the entire surface 102 of the master 100. In the preferred embodiment, the layer of hardened material 104 should have a thickness of approximately ⅛ to 3/16 inches, although its thickness can be selected according to the pattern to be impressed upon the article. It should be noted however, the present invention and method is suitable for flat and/or smooth surfaces as well.

Once the layer of hardened material 104 has dried, a layer of polyester resin 106 is applied to the layer of hardened material 104. In the preferred embodiment, the polyester resin 106 has a thickness of approximately 3/32 inches. Preferably, prior to applying the layer of polyester resin 106 as described above, the surface of the hardened material is sanded with a 20-40 grit sandpaper. Roughing up the surface area prior to applying the layer of polyester resin 106 causes the layer of hardened material 104 to better adhere to the polyester resin.

As is known in the art, characteristics of the polyester resin includes shrinking. As such, multiple layers of vinyl ester (commercially available under the name "Opti PLUS" made by Cook Composites and Polymers Co.) are applied to the polyester resin to prevent the polyester resin from shrinking.

In the preferred embodiment, the application includes at least three (3) layers of vinyl ester. Further, the thickness of each layer of vinyl ester is approximately 1/8 to 3/16 inches per layer.

The method 200 of preparing the hard mold 10 of the present invention is described as follows:

As known in the art, the surface 102 of the master 100 having the desired form and surface on which the hardened material 104 is to be placed is thoroughly cleaned 201 and prepared depending on the master's 100 material type. Then, the hardened material (such as polyurea) in a fluid state is applied 202 in film form to the master surface 102, thereby to form the layer of hardened material 104. Once applied, the uneven surface 102 of the master 100 for example, forms the layer of hardened material 104 having an uneven surface being inverse to the uneven shaping surface to be formed.

Once the layer of hardened material 104 becomes hard (approximately 20 minutes), the surface of the layer of hardened material 104 is roughed up 206 using a 20-40 grit sandpaper.

A polyester resin 106 in a fluid state is then applied 208 in film form to the layer of hardened material 104. Before the polyester resin 106 begins to shrink, multiple layers 108, 112, 114 of vinyl ester is applied to the polyester resin in order to keep the polyester resin from shrinking. In the preferred embodiment, at least three (3) layers of the vinyl ester is applied to the polyester resin 106.

The master 100 is then released from the mold 10 as known in the art.

The present method permits the shaping surface to be performed with increased precision without breaks or cracks occurring to the shaping surface due to unnecessary external forces applied to the shaping surface when the master is removed from the shaping surface. In addition, the resulting mold provides excellent heat and pressure resistance with no loss of shrink control.

Although the description above contains many specificities, these should not be construed as limiting the scope of the invention, but as merely providing illustrations of some of the presently preferred embodiments of this invention. It would be obvious to those skilled in the art that modifications made may be made to the embodiments described above without departing from the scope of the present invention. Thus, the scope of the invention should be determined by the appended claims and the formal application and their legal equivalents, rather than by the examples given.

I claim:

1. A shaping mold comprising:
   a master substrate fixably superposed by a coating of hardened material provided over an entire shaping surface of the master, wherein said hardened material includes a first surface that is an uneven surface being inversed to the shaping surface of the master,
   wherein said hardened material having characteristics of toughness, impact, abrasion, corrosion and thermal shrink resistance and wherein said hardened material does not adhere to the shaping surface of the master substrate,
   a layer of polyester resin applied to a second surface of said hardened material,
   multiple layers of vinyl ester linked with the polyester resin,
   wherein the layer of hardened material has a thickness of approximately 1/8 to 3/16 inches,
   wherein the layer of polyester resin has a thickness of approximately 3/32 inches, and
   wherein each of the multiple layers of vinyl ester has a thickness of approximately 1/8 to 3/16 inches.

2. The shaping mold as recited in claim 1, wherein the hardened material is a polyurea coating.

3. The shaping mold is recited in claim 1, wherein there are at least three (3) layers of vinyl ester.

4. A shaping mold comprising:
   a master substrate fixably superposed by a coating of hardened polyurea material provided over an entire shaping surface of the master, wherein said hardened material includes a first surface that is the inverse of the master shaping surface and a second surface that is a roughened surface,
   a layer of polyester resin applied to the second surface of said hardened polyurea material, at least three (3) layers of vinyl ester linked with the polyester resin,
   wherein the layer of polyurea material has a thickness of approximately 1/8 to 3/16 inches,
   wherein the layer of polyester resin has a thickness of approximately 3/32 inches, and
   wherein each of the multiple layers of vinyl ester has a thickness of approximately 1/8 to 3/16 inches.

5. A shaping mold comprising:
   a master substrate having surface patterns and fixably superposed by a coating of hardened material provided over an entire shaping surface of the master, wherein said hardened material includes a first surface that includes an inverse of the surface patterns, wherein said hardened material does not adhere to the surface of the master substrate,
   a layer of polyester resin applied in a liquid state to a second surface of said hardened material opposite said first surface,
   multiple layers of vinyl ester linked with the polyester resin to prevent shrinkage of the polyester resin,
   wherein the layer of hardened material has a thickness in the range of 1/8 to 3/16 inches to form a patterned first surface that is hard and does not adhere to said master substrate.

6. The shaping mold as recited in claim 5, wherein the second surface of said hardened material is rough to adhere to said polyester resin layer.

7. The shaping mold as recited in claim 5, wherein the hardened material is polyurea coating.

8. The shaping mold as recited in claim 5, wherein the multiple layers of vinyl ester includes at least three separate layers applied in liquid form.

* * * * *